May 12, 1959 D. B. SEAGER 2,886,264
STALL ROLL CONTROL DEVICE FOR VERTICAL TAKE-OFF AIRPLANE
Filed May 17, 1957 2 Sheets-Sheet 2

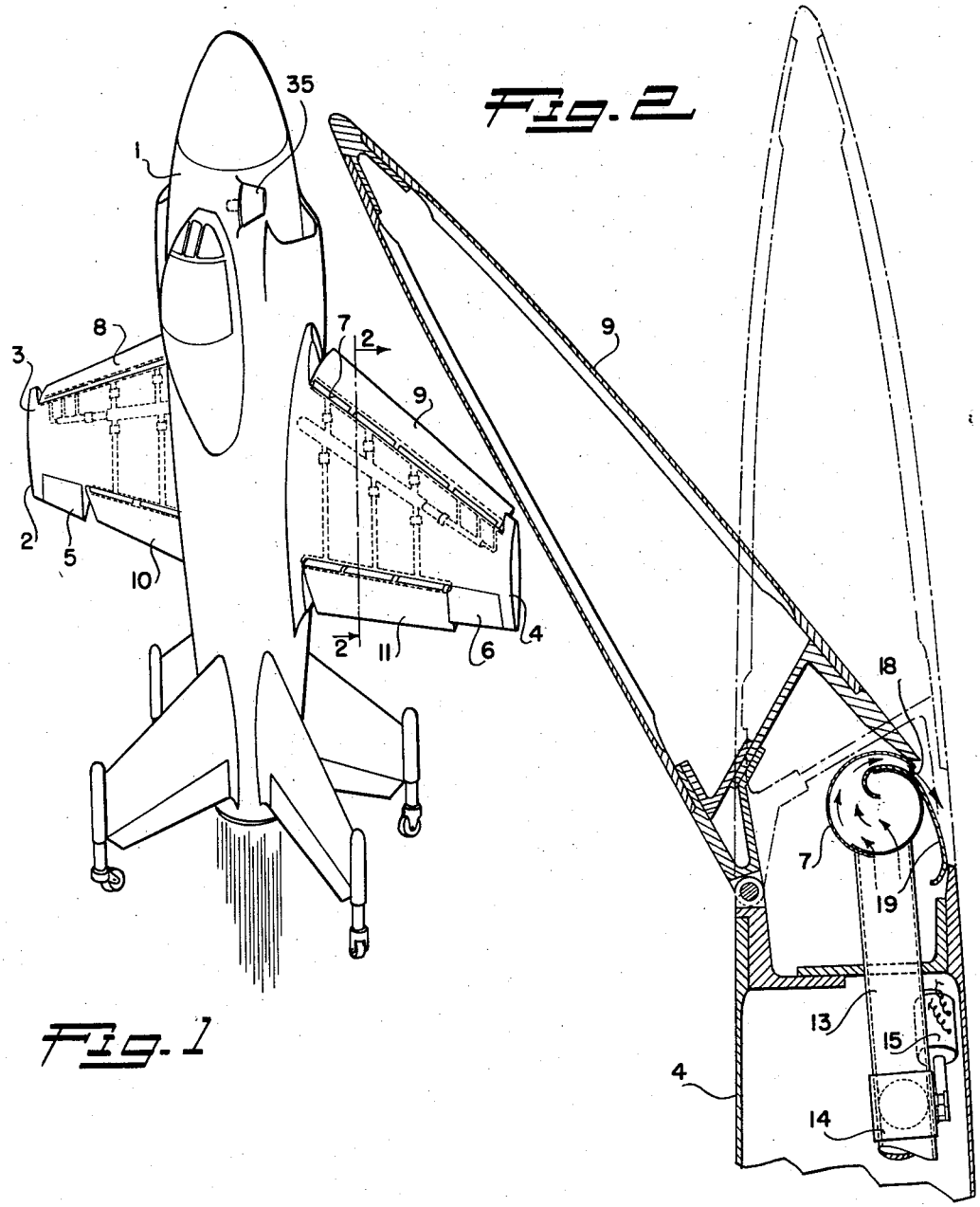

INVENTOR.
DONALD B. SEAGER
BY
George C. Sullivan
Agent

United States Patent Office 2,886,264
Patented May 12, 1959

2,886,264

STALL ROLL CONTROL DEVICE FOR VERTICAL TAKE-OFF AIRPLANE

Donald B. Seager, Burbank, Calif., assignor to Lockheed Aircraft Corporation, Burbank, Calif.

Application May 17, 1957, Serial No. 659,782

6 Claims. (Cl. 244—42)

This invention relates generally to aircraft controls and more particularly to a method and apparatus for maintaining a substantially symmetrical wing loading beyond the critical angle of attack when a fully developed stall is being encountered. Normally at such angles of attack the stall pattern is unpredictable often resulting in unsymmetrical wing loads causing the aircraft to roll off on one wing. With high speed aircraft this roll off tends to be unacceptably violent. The method and device disclosed herein forces the wing to stall symmetrically by applying progressive spanwise segmented boundary layer control.

As used herein, the term "critical angle of attack" means that angle of attack beyond which flow about a wing changes abruptly and a stalling condition is encountered. Also, the term "characteristic critical angle of attack" means that critical angle of attack at which the wing will stall without the use of the segmented boundary layer control high lift device.

Various high lift devices including boundary layer control systems are conventionally employed for increasing the critical angle of attack of a wing to reduce the stalling speed of airplanes. The basic means for increasing the critical angle of attack is employed in this invention to maintain a substantially symmetrical wing loading at the entry to a fully developed stall. By increasing the critical angle of attack at a predetermined angular difference between the actual angle of attack and a characteristic critical angle of attack of the wing and by returning the wing critical angle of attack to the characteristic critical angle of attack at an actual angle of attack position beyond the characteristic critical angle of attack, the wing loading may be maintained substantially symmetrical under all conditions to eliminate any roll off tendencies of the airplane.

Aircraft of the type adapted to take-off and land vertically must undergo a transition maneuver involving stalling the wing in order to go from normal flight to hovering. In this transition maneuver it is important to maintain the wing loading substantially symmetrically so that rolling moments occurring on the wing will be eliminated or reduced to a substantially negligible level whereby roll control of the airplane may be maintained at low forward velocities and with little loss in altitude. It is this use which the stall roll control device and method described herein is directed through the invention is obviously applicable to aircraft other than those of the vertical take-off and landing type.

An object of this invention is to provide a stall roll control device for maintaining the wing loading substantially symmetrical at high angles of attack at the threshold of a fully developed stall condition.

Another object of this invention is to provide a stall roll control device which is responsive to the airplane angle of attack for controlling the actuation of a high lift device for increasing the critical angle of attack at which the wing will stall and then return the wing to its characteristic stalling angle of attack after the actual angle of attack has passed the characteristic critical angle of attack.

Still another object of this invention is to provide a stall roll control device which progressively applies boundary layer control air to the wing of an aircraft at predetermined spanwise stations to avoid a sudden or non-symmetrical loss of lift and to maintain maximum aileron effectiveness.

Still another object of this invention is to provide a stall roll control device which is suitable for use with thin wings on high speed aircraft and which is simple and dependable in operation.

Further and other objects will become apparent from a reading of the following detail description especially when considered in combination with the accompanying drawing wherein like numerals refer to like parts.

In the drawings:

Figure 1 is a perspective view of an aircraft incorporating the stall roll control device of this invention;

Figure 2 is a sectional view taken approximately on line 2—2 of Figure 1;

Figure 3:
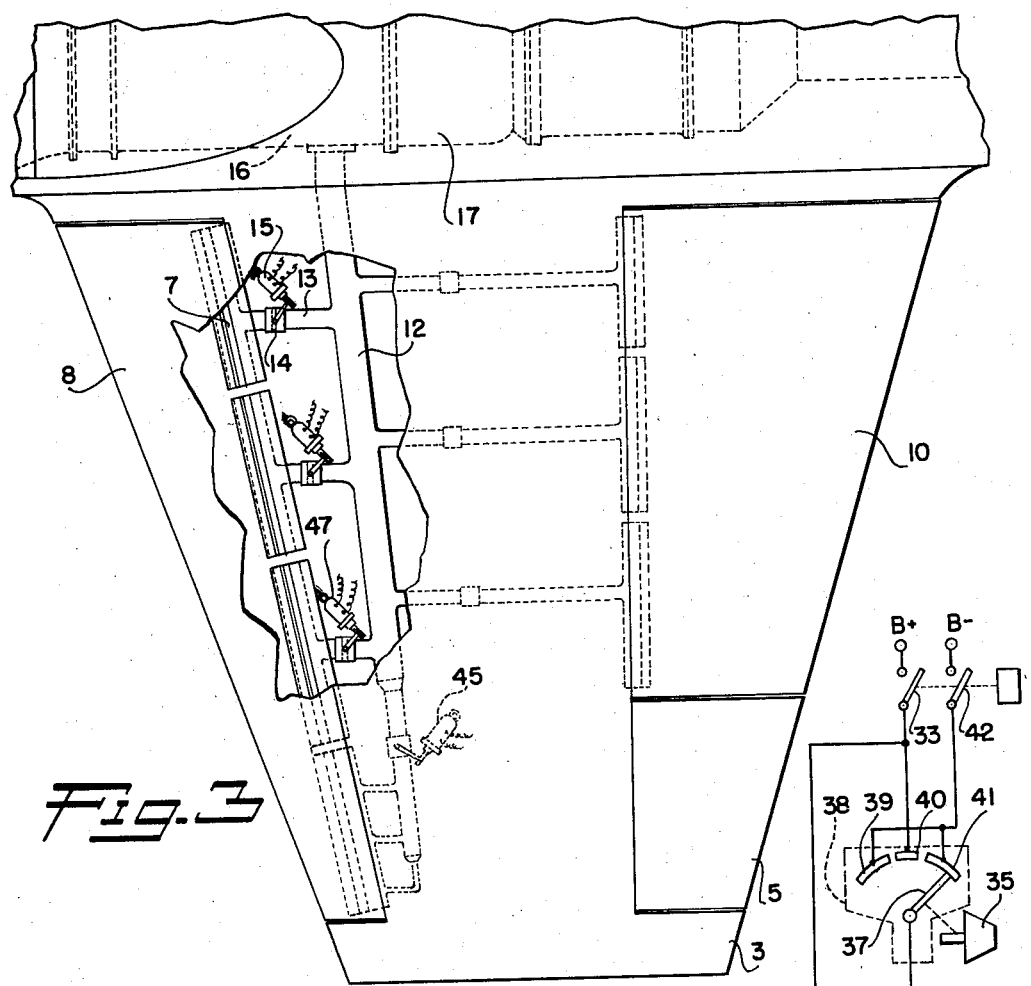
Figure 3 is a fragmentary plan view of an aircraft wing showing the segmented boundary layer bleed ports forming a part of the stall roll control device.

Referring to Figure 1 a vertical take-off and landing type aircraft 1 is provided with a main sustaining wing 2 projecting outwardly from the fuselage on either side thereof providing left and right-hand wing panels 3 and 4. So long as the left and right-hand wing panels exhibit a substantially symmetrical wing loading no significant rolling moments are produced by the wing. However should the left wing panel, for example, suddenly produce substantially less lift than the right wing panel a high rolling moment is generated which must be counteracted by ailerons 5 and 6. At high angles of attack where a fully developed stall is approaching, aileron effectiveness is usually at a minimum providing insufficient roll control to counteract the rolling moment produced by the unsymmetrical stall. This is particularly true at slow speeds where the transition between normal flight to hovering is accomplished. To eliminate this roll control problem at the entry to a fully developed stall, a plurality of segmented or individual boundary layer jet manifolds 7 are carried by the wing and symmetrically arranged in a spanwise direction on both the left and right-hand wing panels 3 and 4. The chordwise arrangement of the jet manifolds is not critical, however for most effective operation with the particular wing shown they are located adjacent the hinge line of leading edge slats or flaps 8 and 9 and trailing edge flaps 10 and 11. Each of the jet manifolds 7 is individually coupled to a main air duct 12 through piping 13 which incorporates a suitable valve 14. When valve 14 is open, fluid flow between the main air duct 12 and the associated manifold 7 occurs and when the valve is closed, fluid flow through the jet manifold is blocked. Valve 14, associated with each manifold 7, is operatively connected to a suitable actuator such as a solenoid 15 as best shown in Figure 3.

Any suitable means may be employed to effect fluid flow through the duct for boundary layer control, however for purposes of illustration, duct 12 is shown coupled to the compressor 16 of a jet engine 17 serving as the power plant for the airplane. The compressed air from compressor 16 is at a pressure sufficient to cause flow through the several manifolds when the respective valves 14 are opened. By directing this air flow over the surface of the wing the effect of the boundary layer is reduced, allowing the wing to operate more efficiently as a lift producing element and as a result the critical angle of attack of the wing is increased. The actual magnitude of the increase in the critical angle of attack depends largely upon the efficiency of the boundary layer control system being used. However an increase of 3 to 5 degrees in critical angle of attack may easily be obtained.

In addition to the boundary layer control system, other high lift devices may be employed such as the trailing edge and leading edge flaps herein described in connection with Figure 1. When the flaps are deflected downwardly as illustrated in Figure 1 a further incremental increase in the critical angle of attack is obtained in addition to that resulting from the use of the boundary layer control system. The two different types of high lift devices may be integrated into the aircraft structure as best shown in Figure 2 wherein the flap such as leading edge flap 9 is hinged to the wing panel so that when it is deflected, an exhaust port 18 formed in manifold 7 opens onto the external surface of the wing, directing the boundary layer control air toward the trailing edge of the wing. Each manifold 7 is provided with a baffle plate 19 which extends beyond port 18 and is spring urged against the inner surface of the wing skin structure for minimizing turbulence in the area of the manifold.

As is apparent from Figure 2 only when the flaps 8, 9, 10 and 11 are deflected is the boundary layer control system operable. This particular configuration is largely a matter of design choice, it being obvious the boundary layer system may in certain cases be designed for operation independently of the flaps or the flaps may be eliminated entirely. They are illustrated in the drawing inasmuch as the configuration is desirable for aircraft of the type adapted to land and take-off vertically. In the approach to the transition between horizontal and vertical flight the leading edge and trailing edge flaps are deflected to a high lift position so that the forward velocity of the airplane may be reduced to a minimum prior to performing the transition maneuver of orienting the longitudinal axis of the aircraft from a horizontal position to a vertical position with respect to the earth.

As the critical angle of attack of the wing is approached the boundary layer system is turned on until the characteristic angle of attack is passed. Then the boundary layer control system is turned off by closing valves 14 progressively. As the boundary layer control air is removed sequentially, the transition between below-the-stall attitudes and stalling attitudes is controlled to prevent excessive rolling moments due to the development of unsymmetrical wing loads.

Figure 4:
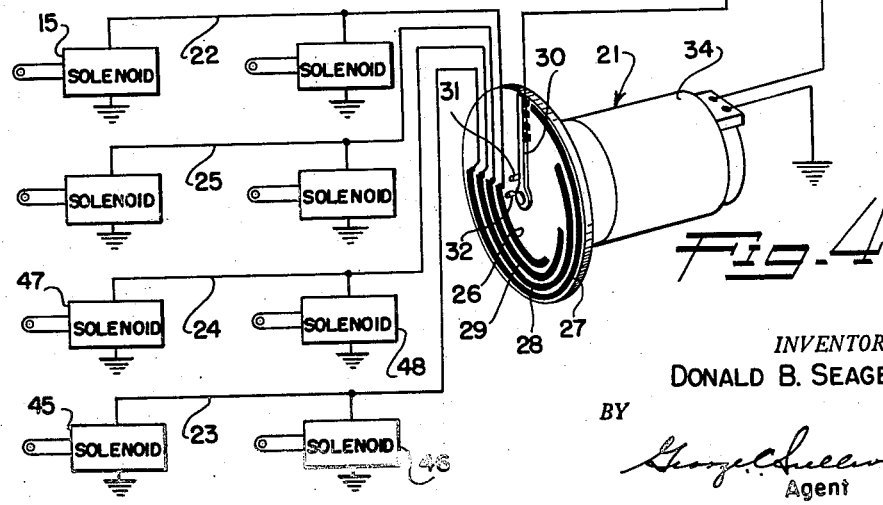
Figure 4 is a schematic view showing the sequencing circuitry for the stall roll control device.

Sequential control of valves 14 to apply boundary layer control progressively in a spanwise direction is shown in Figure 4 wherein the plurality of solenoids 15 are coupled to a sequencer 21. The two solenoids which are nearest the fuselage of the aircraft on either side thereof are electrically coupled to the sequencer for simultaneous operation through lead 22. Subsequent pairs of solenoids one from each wing panel are similarly coupled to the sequencer so that the solenoids in each pair will operate simultaneously. The outboard solenoids 45 and 46 are coupled to the sequencer through lead 23 and the next pair of solenoids 47 and 48 inboard from the wing tip are coupled through lead 24 and the next pair of solenoids are coupled by lead 25. Since each pair of solenoids are to be operated to provide progressive spanwise boundary layer control, actuation must be sequential and in a predetermined order. Whether the boundary layer control is first initiated at the outboard sections of the wing or at the inboard sections or at any other spanwise location is largely a matter of choice for a particular airplane. However, in general, it is desirable to keep the wing in the spanwise location of the aileron below the stall as long as possible since the aileron unless stalled out provides substantial roll control. Therefore, the circuitry of Figure 4 illustrates the configuration wherein the boundary layer control air is first applied to the wing at the outboard manifolds 7 and works inboard progressively until all of the solenoids are energized. When the boundary layer control system is turned off the sequence starts at the inboard stations and works outboard so that the flow of air through the inboard manifolds is cut off first while the flow of air through the outboard manifolds is cut off last. This allows the ailerons to remain effective as long as possible in a transition maneuver from horizontal to vertical flight and allows them to become effective at the earliest possible time in a transition maneuver from vertical to horizontal flight. At the same time, the change in lift produced by the wing as it goes from a stalling attitude to a below-the-stall attitude and vice versa is at a controlled rate. If the several boundary layer control manifolds were operated simultaneously the change in lift would be quite abrupt making it difficult to maintain control.

The sequencing may be effected by any suitable scheme such as by employing a plurality of conductive strips 26, 27, 28 and 29 as a part of the sequencer wherein each of the strips are of a different length. Leads 22, 23, 24 and 25 from the pairs of solenoids are electrically connected to conductive strips 26, 27, 28 and 29 respectively so that as a wiper arm 30 is rotated between the limits defined by stops 31 and 32, air flow through the inboard manifolds in both wing panels will be turned on last and off first with respect to the outboard manifolds. Wiper arm 30 is connected to B+ through a switch 33. Rotation of wiper arm 30 is effected by a reversible motor 34 which with the wiper and conductive strips constitute the sequencer.

The proper timing for the use of boundary layer control is determined by the angle of attack of the airplane. Accordingly, a vane 35 as shown in Figures 1 and 4 is swingably carried on the aircraft to indicate angle of attack. This vane drives a wiper arm 37 forming part of a segmented switch 38. Switch 38 is provided with three contacts 39, 40 and 41 each arranged for sequential engagement with wiper arm 37 as it is rotated by vane 35 to represent the airplane angle of attack. The two outer contacts 39 and 41 are both coupled to a negative source of potential identified as B— through switch 42 which is mechanically coupled with switch 33 for simultaneous operation manually or otherwise. Intermediate contact 40 of switch 38 connects with the B+ source of electrical potential through switch 33. When switch arm 37 is in contact with either of the outer contacts 39 and 41, wiper arm 30 of sequencer 21 is urged by motor 34 to the position against stop 31 as shown by Figure 4. When the angle of attack of the airplane reaches a magnitude such that wiper arm 37 engages contact 40, motor 34 drives switch arm 30 of the sequencer until the wiper arm engages stop 32. The wiper arm remains in this position until the angle of attack of the airplane has either increased or decreased sufficiently that wiper arm 37 of switch 38 is moved out of engagement with contact 40 and into engagement with either contacts 39 or 41 at which time reversible motor 34 returns wiper arm 30 of the sequencer to the de-energized position against stop 31. Due to the use of different lengths of conductive strips 26, 27, 28 and 29 the desired sequential operation of the boundary layer control is accomplished causing the wing to maintain a symmetrical load distribution throughout the transition between horizontal and vertical flight with the change in lift occurring over a predetermined finite time interval.

On the ground and during normal horizontal flight of the airplane where the wing is below the stalling attitude, switches 33 and 42 are in the open position de-energizing the system. When preparing for a landing the pilot energizes the system by closing switches 33 and 42 and proceeds to decrease air speed. When the air speed reaches a predetermined minimum the leading edge and trailing edge flaps are lowered as shown in Figure 1 and the air speed is decreased still further while the angle of attack of the airplane is increased to maintain sufficient lift to avoid excessive losses in altitude. As the angle of attack increases this is detected by vane 35 and at the threshold to the characteristic stalling angle of attack, wiper arm 37 of switch 38 engages contact 40, connecting motor 34 of the sequencer with B+. This drives wiper arm 30 on the sequencer in a clockwise direction as viewed in Figure 4. This first energizes the solenoids 45 and 46 actuating their associated valves 14 and allowing air flow through the outboard manifolds on either wing panel. Continued movement of wiper arm 30 energizes the solenoids 47 and 48 to open the associated valves and allow air flow through the manifolds next to the outboard manifolds. Continued movement of wiper arm 30 progressively opens the remaining manifolds in both wing panels with the inboard manifolds on each wing panel being opened to the flow of boundary layer control air last. The leading edge and trailing edge flaps having previously been deflected, provides an unrestricted opening through which the fluid flowing through the manifold may be exhausted over the upper surface of the wing. This substantially increases the angle of attack at which the wing will stall and allows the aircraft to reduce the airspeed still further.

With the boundary layer control system turned "on" the airplane angle of attack is increased to an angle of attack which is below the critical angle of attack of the wing with the boundary layer control system operating and above the characteristic critical angle of attack at which the wing would stall in the absence of the use of boundary layer control. At such an angle of attack, wiper arm 37 disconnects motor 34 from the source of B+ and couples it with B− through engagement with contact 39. This causes motor 34 to reverse its direction of rotation and return wiper arm 30 towards the position shown in Figure 4 during which time the boundary layer control air is cut off progressively in a spanwise direction starting at the inboard manifolds on each wing panel. The period of time in which the manifolds are sequentially closed is largely a matter of design however it may be stated that generally all manifolds should close within a time interval in the neighborhood of 5 seconds. In any event, the operation of closing the boundary air control manifolds to the flow of air should be accomplished within the period when the angle of attack exceeds the characteristic critical angle of attack of the wing and before the critical angle of attack of the wing as obtained by the use of the boundary layer control as a high lift device is exceeded. By this means, stalling of the wing is effectively induced with the stall starting at the wing root and working outboard on each wing panel as the boundary layer control air is turned off. Thus a symmetrical wing loading is maintained with aileron effectiveness being also maintained for lateral control until the transition maneuver is substantially completed. Obviously as the last manifold is cut off from the flow of boundary layer air, that section of the wing will stall and blanket the aileron causing it to lost its effectiveness as a control surface. However when this occurs the entire wing representing both wing panels on either side of the fuselage has stalled out producing little lift and substantially no rolling moments due to an unsymmetrical wing loading condition.

After the transition maneuver has been performed wherein the wing has reached a fully stalled condition the aircraft continues to increase in angle of attack to a vertical position with substantially all of the sustaining force being produced by the power plant. Through the use of auxiliary controls such as jet blast deflectors or auxiliary jets (not shown) the airplane may safely descend to a landing.

In a vertical take-off, the airplane ascends to the desired altitude for making a transition maneuver for horizontal flight through the use of its power plant in much the same manner as the descent is accomplished. As the transition maneuver from vertical to horizontal flight is undertaken, angle of attack vane 35 causes the boundary layer control air to be turned on starting at the outboard manifold and working inboard toward the fuselage at an angle of attack which is below the critical angle of attack of the wing with boundary layer control and above the characteristic critical angle of attack of the wing without boundary layer control. Thus the transformation from a stalling condition to a laminar flow condition is brought about in a controlled fashion to avoid high rolling moments at a time when forces for controlling the rolling moments are marginal. After the wing angle of attack passes the characteristic critical angle of attack near the completion of the transition maneuver from vertical to horizontal flight, the angle of attack vane 35, through operation of switch 38, causes the boundary layer control air to be cut off in a progressive manner starting at the inboard manifolds and working outboard. However since the angle of attack of the wing is below the characteristic critical angle of attack the stalling condition is not re-encountered, allowing the airplane to fly in a conventional manner with the wing providing the lift to maintain altitude while the power plant thrust is employed for the purpose of maintaining the desired forward speed.

While the increase in the characteristic critical angle of attack of the wing is preferably accomplished as described herein by a segmented boundary layer control device, other types of high lift devices so long as they are capable of increasing the characteristic critical angle of attack of the wing as described herein, may obviously be used to obtain the same benefits taught by the method. Furthermore it is intended that the disclosed circuitry for effecting sequential actuation of the segmented boundary layer control manifolds is illustrative only and that any type of control may be employed without departing from the teachings of the invention. Also the device and method is applicable to aircraft other than the vertical take-off and landing type and such use is considered to be within the teachings of this invention.

It should be understood that certain alterations, modifications and substitutions such as those suggested hereinabove may be made to the instant disclosure without departing from the spirit and scope of this invention as defined by the appended claims.

I claim:

1. In an aircraft having a fuselage and a wing projecting outwardly from the fuselage on either side thereof, said wing having a plurality of ports formed therein and spaced apart in a spanwise direction on either side of the fuselage for directing fluid therethrough onto the upper surface of the wing to establish a high lift critical angle of attack, a plurality of ducts each communicating with one of the plurality of ports, a fluid pump carried within the aircraft, valve means coupling each said duct with said pump for controlling the flow of fluid through each of said ports, and valve control means responsive to a predetermined angular difference between the actual angle of attack and the characteristic critical angle of attack for allowing fluid flow through said ports to establish the high lift critical angle of attack.

2. In an aircraft having a fuselage and a wing projecting outwardly from the fuselage on either side thereof, said wing having a plurality of ports formed in the upper surfaces thereof and spaced apart in a spanwise direction on either side of the fuselage for directing fluid therethrough to establish a high lift critical angle of attack, duct means communicating with each of the plurality of ports, a fluid pump carried within the aircraft, valve means coupling said duct means with said pump for controlling the flow of fluid through each of said ports independently, and control means operatively connecting with said valve means and being responsive to a predetermined angular difference between the actual angle of attack and the characteristic critical angle of attack for actuating said valve means and progressively opening said ports to the flow of fluid to establish the high lift critical angle of attack.

3. In an aircraft having a fuselage and a wing projecting outwardly from the fuselage on either side thereof, a device comprising, a spanwise series of high lift devices carried by the wing, an actuator for operating each said high lift devices, vane means detecting the aircraft angle of attack, and sequencer means controlled by said vane means and connecting with the actuators for progressively energizing the same when the critical angle of attack is approached and for de-energizing the same when the critical angle of attack is passed, maintaining a substantially symmetrical wing loading through the threshold into a fully developed stall.

4. An aircraft for vertical take-off and landing comprising, a fuselage, a wing secured to said fuselage and projecting outwardly therefrom on both sides for producing lift, said wing having a plurality of openings formed therein on either side of the fuselage, said openings being spaced apart and symmetrically arranged in a spanwise direction, a plurality of individual ducts carried within said wing, each duct connecting with one of the openings, a fluid pump carried within the aircraft, a valve coupling each individual duct with said pump whereby fluid is caused to flow through the opening only when the valve is open to produce a high lift critical angle of attack, angle of attack sensing means carried on the aircraft, and control means connecting with said sensing means and with said valves and holding said valves open only through a predetermined angle of attack range which includes only the characteristic critical angle of attack whereby to control the stall and maintain a substantially symmetrical wing loading.

5. In an aircraft having a fuselage and a wing projecting outwardly from the fuselage on either side thereof, a device comprising, segmented high lift means carried by the wing and arranged symmetrically in a spanwise direction on either side of the fuselage for selectively increasing the wing critical angle of attack relative to its characteristic critical angle of attack to provide a characteristic high lift angle of attack, control means operatively connecting with said segmented high lift means for actuating the latter to maintain the characteristic high lift angle of attack so long as the actual angle of attack is within a range including the characteristic critical angle of attack and below the characteristic high lift angle of attack.

6. A device as set forth in claim 5 wherein said control means includes a sequencer effecting spanwise progressive actuation of said segmented high lift means.

References Cited in the file of this patent

UNITED STATES PATENTS

| | | |
|---|---|---|
| 2,496,565 | Stalker | Feb. 7, 1950 |
| 2,511,504 | Hawkins | June 13, 1950 |

FOREIGN PATENTS

| | | |
|---|---|---|
| 743,598 | Great Britain | Jan. 18, 1956 |